United States Patent
Pydin

(10) Patent No.: US 12,461,527 B2
(45) Date of Patent: Nov. 4, 2025

(54) MOVING BODY

(71) Applicant: HONDA MOTOR CO., LTD., Tokyo (JP)

(72) Inventor: Andrii Pydin, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 289 days.

(21) Appl. No.: 18/088,833

(22) Filed: Dec. 27, 2022

(65) Prior Publication Data

US 2023/0205210 A1 Jun. 29, 2023

(30) Foreign Application Priority Data

Dec. 28, 2021 (JP) .................................. 2021-213927

(51) Int. Cl.
*G05D 1/00* (2024.01)
*G06V 20/56* (2022.01)

(52) U.S. Cl.
CPC ......... *G05D 1/0212* (2013.01); *G05D 1/0094* (2013.01); *G06V 20/56* (2022.01)

(58) Field of Classification Search
CPC .. G05D 1/0212; G05D 1/0094; G05D 1/0214; G05D 1/0246; G06V 20/56; G06V 20/58
See application file for complete search history.

(56) References Cited

U.S. PATENT DOCUMENTS

| | | | |
|---|---|---|---|
| 9,477,894 B1* | 10/2016 | Reed | G06V 20/586 |
| 10,242,519 B2* | 3/2019 | Nagler | B60R 25/24 |
| 10,754,350 B2* | 8/2020 | Russell | G05D 1/0094 |
| 11,060,329 B2* | 7/2021 | Richards | E05F 15/431 |
| 2011/0181457 A1* | 7/2011 | Basten | G01S 17/08 342/70 |
| 2015/0300073 A1* | 10/2015 | Ihlenburg | E05F 15/74 701/49 |
| 2015/0355333 A1* | 12/2015 | Ono | G05D 1/024 356/4.01 |
| 2017/0072558 A1* | 3/2017 | Reynolds | G05D 1/024 |
| 2018/0029283 A1* | 2/2018 | Baumgarte | B29C 49/6409 |
| 2018/0088583 A1* | 3/2018 | Wang | G05D 1/0217 |
| 2018/0281191 A1* | 10/2018 | Sinyavskiy | A47L 11/4061 |
| 2019/0056739 A1* | 2/2019 | Sunil Kumar | G05D 1/0088 |
| 2019/0196480 A1* | 6/2019 | Taylor | G05D 1/0223 |
| 2019/0287262 A1* | 9/2019 | Hilnbrand | G06V 20/58 |
| 2020/0225673 A1* | 7/2020 | Ebrahimi Afrouzi | A47L 11/4011 |
| 2021/0347384 A1* | 11/2021 | Hongo | B25J 9/1666 |
| 2023/0376045 A1* | 11/2023 | Ejstrup Hansen | B66F 9/063 |

FOREIGN PATENT DOCUMENTS

JP 2017-227955 12/2017

* cited by examiner

*Primary Examiner* — Abdalla A Khaled
(74) *Attorney, Agent, or Firm* — Amin, Turocy & Watson, LLP

(57) ABSTRACT

A moving body includes a sensor that detects a protruding portion of a load, a determination unit that determines whether or not the protruding portion is present, a footprint setting unit that sets a footprint formed by a first region obtained by projecting the moving body on the ground and a second region obtained by projecting the protruding portion on the ground or a footprint formed by the first region, depending on the presence or absence of the protruding portion, and a travel control unit that controls traveling of the moving body based on the footprint.

5 Claims, 7 Drawing Sheets

MOVING BODY

CROSS-REFERENCE TO RELATED APPLICATIONS

This application is based upon and claims the benefit of priority from Japanese Patent Application No. 2021-213927 filed on Dec. 28, 2021, the contents of which are incorporated herein by reference.

BACKGROUND OF THE INVENTION

Field of the Invention

The present invention relates to a moving body for carrying a load.

Description of the Related Art

A technique for performing movement control of a moving body based on a footprint of the moving body is known. An example of such a technique is disclosed in JP 2017-227955 A.

According to JP 2017-227955 A, a reference circle (footprint) circumscribed about a projection of a moving robot (moving body) onto the ground is created. When a load (article, component, etc.) carried by the moving robot protrudes from the reference circle, the reference circle is set again so as to be circumscribed about the load. The moving robot avoids contact with obstacles by moving such that the obstacles do not enter the reference circle.

SUMMARY OF THE INVENTION

In the conventional technique according to JP 2017-227955 A, the footprint becomes too large. As a result, the moving robot according to JP 2017-227955 A may erroneously determine that a road is impassable even though the moving body actually can pass through the road.

An object of the present invention is to solve the above-mentioned problems.

According to an aspect of the present invention, there is provided a moving body equipped with a loading platform and configured to carry a load loaded on the loading platform, the moving body including: a sensor configured to detect a protruding portion of the load, the protruding portion protruding from the loading platform; a determination unit configured to determine whether or not the protruding portion is present based on a signal of the sensor; a footprint setting unit configured to set, as a footprint, a region formed by a first region obtained by projecting the moving body onto a ground and a second region obtained by projecting the protruding portion onto the ground when the load protrudes from the loading platform, and set the first region as the footprint when the load does not protrude from the loading platform; and a travel control unit configured to control traveling of the moving body based on the footprint.

According to the present invention, it is possible to more accurately determine whether or not a route is passable for the moving body, based on the footprint.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Embodiment

Figure 1:
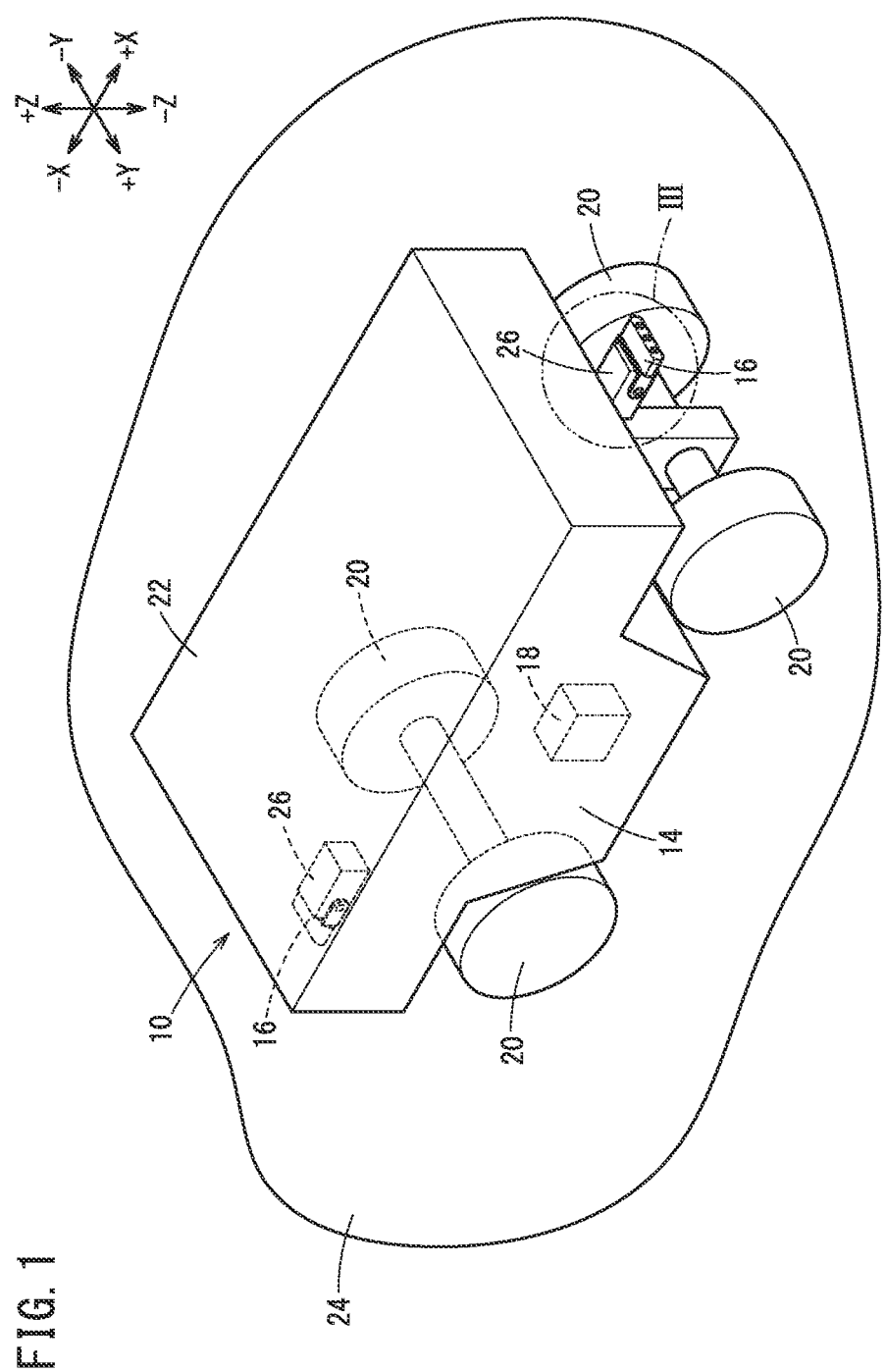
FIG. 1 is a schematic diagram of a moving body according to an embodiment of the present invention.

FIG. 1 is a schematic diagram of a moving body 10 according to an embodiment of the present invention.

Each drawing including FIG. 1 shows not only the moving body 10 but also an X (+X, −X) direction, a Y (+Y, −Y) direction, and a Z (+Z, −Z) direction. The X direction, the Y direction, and the Z direction are orthogonal to each other. The +X direction indicates a direction of forward movement of the moving body 10. The −X direction indicates a direction of backward movement of the moving body 10. The +Y direction indicates a right direction of the moving body 10. The −Y direction indicates a left direction of the moving body 10. The +Z direction indicates an upward direction. The −Z direction indicates a downward direction.

The moving body 10 is, for example, a four wheel cart. The moving body 10 travels to carry a load (articles, components, parts, etc.) 12 (see also FIG. 2). The moving body 10 includes a vehicle body 14, a sensor 16, and a control device 18. The number of sensors 16 included in the moving body 10 is two.

A plurality of (four) wheels 20 are provided at a lower portion of the vehicle body 14. The four wheels 20 are in contact with a running surface (the ground) 24. The moving body 10 travels on the running surface 24 by rotation of the four wheels 20.

The running surface 24 is parallel to a horizontal plane. However, the moving body 10 may travel on an inclined surface (slope).

The vehicle body 14 includes a loading platform 22. The loading platform 22 is located at an upper portion of the vehicle body 14. A load 12 is loaded on the loading platform 22.

Figure 2:
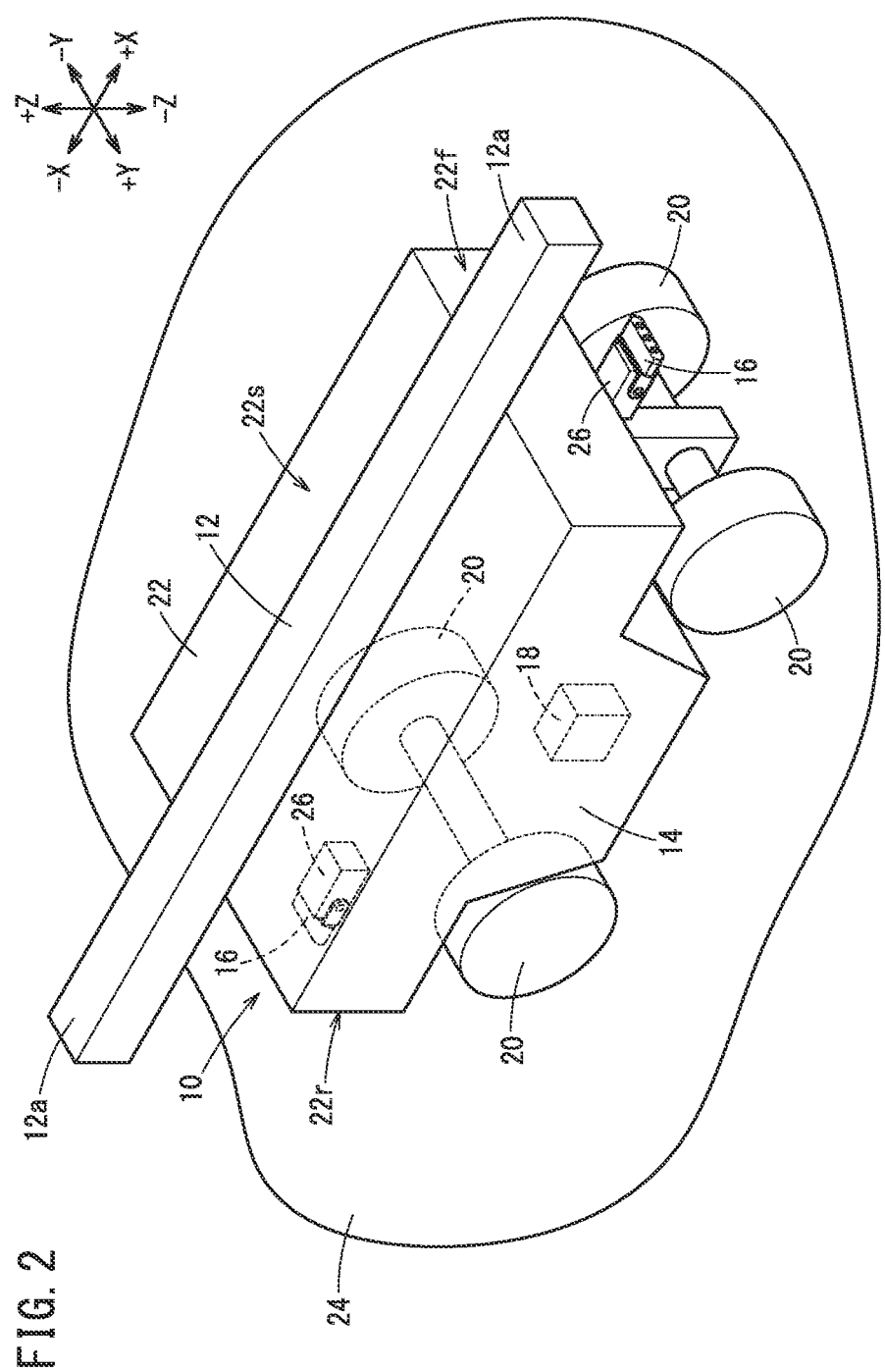
FIG. 2 is a schematic diagram of the moving body in a state in which a load is loaded on a loading platform.

FIG. 2 is a schematic view of the moving body 10 in a state in which a load 12 is loaded on the loading platform 22.

The sensor 16 is provided to detect a protruding portion 12a of the load 12 loaded on the loading platform 22, which protrudes from the loading platform 22. The sensor 16 is, for example, a distance measuring sensor such as a depth camera, a LiDAR, or the like. However, the sensor 16 may be, for example, an image sensor (camera).

The sensor 16 is disposed below a supporting surface 22s of the loading platform 22. Since the sensor 16 is disposed below the supporting surface 22s, interference between the sensor 16 and the load (article, part, etc.) 12 loaded on the loading platform 22 is prevented. Since the interference between the sensor 16 and the load 12 is prevented, the sensor 16 or the load 12 is prevented from being damaged by the interference. In addition, the position of the load 12 is prevented from being displaced due to the interference between the sensor 16 and the load 12.

Here, a case where the sensor 16 is a depth camera will be described. Here, a case in which the sensor 16 is disposed on each of a front end portion 22f of the loading platform 22 and a rear end portion 22r of the loading platform 22 will be described.

However, a description of the sensor 16 disposed at the rear end portion 22r substantially overlaps a description of the sensor 16 disposed at the front end portion 22f. In order to avoid redundant description, the description of the sensor 16 disposed at the rear end portion 22r is omitted in the following description.

Figure 3:
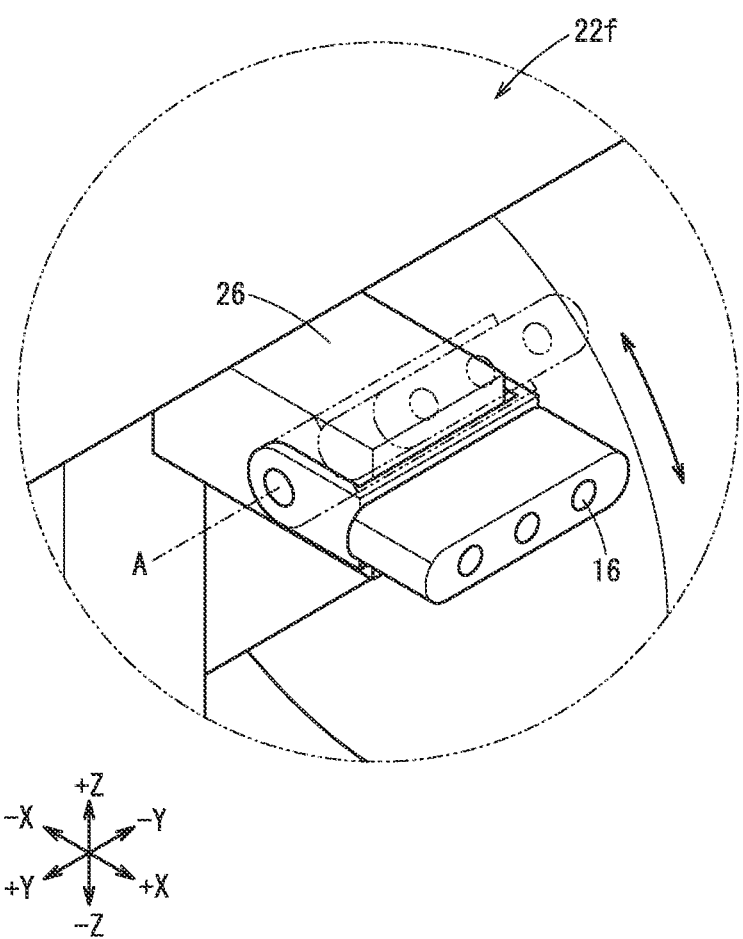
FIG. 3 is a diagram for explaining the inside of a circled area III in FIG. 1.

FIG. 3 is a diagram for explaining the inside of a circled area III in FIG. 1.

The sensor 16 is attached to a drive unit 26. The drive unit 26 rotates the attached sensor 16. The drive unit 26 includes an actuator serving as a driving source. The actuator is, for example, a servomotor.

The drive unit 26 changes the detection range R of the sensor 16 by rotating the sensor 16. A straight line A in FIG. 3 indicates a rotation axis of the sensor 16. The straight line A is parallel to the Y direction.

Figure 4A:
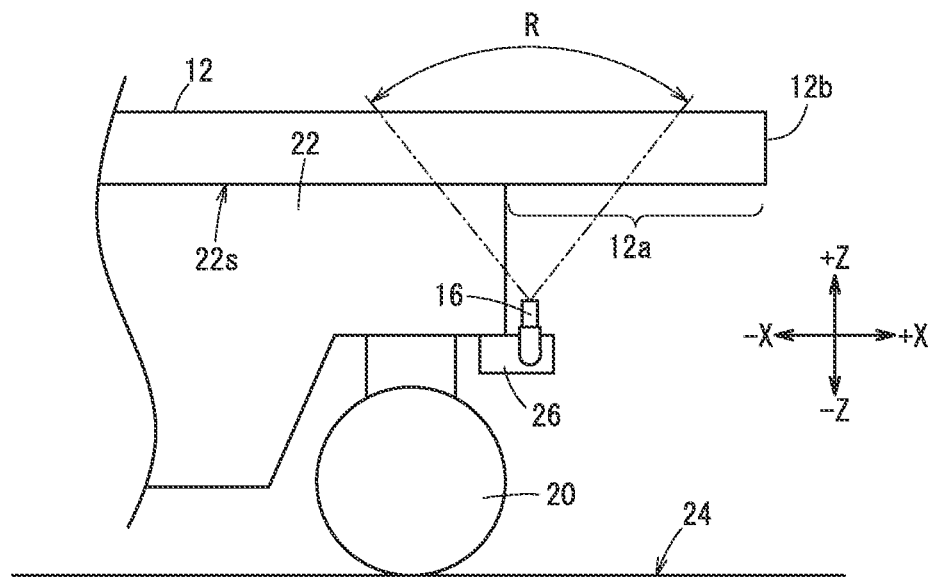
FIG. 4A is a diagram illustrating a loading platform and a sensor that detects an object (load) around the loading platform.

FIG. 4A is a view for explaining the loading platform 22 and the sensor 16 detecting an object (load 12) around the loading platform 22.

The sensor 16 outputs a detection signal corresponding to an object within the detection range R of the sensor 16 and a distance between the object and the sensor 16. The detection range R illustrated in FIG. 4A contains the front end portion 22f of the loading platform 22. Therefore, by analyzing the detection signal of the sensor 16 output based on the detection range R in FIG. 4A, it is possible to distinguish whether the object in the detection range R is an object placed on the loading platform 22 or an object not placed on the loading platform 22. That is, by analyzing the detection signal of the sensor 16 output based on the detection range R in FIG. 4A, it is possible to distinguish whether the object in the detection range R is the load 12 or an object other than the load 12.

However, the detection range R illustrated in FIG. 4A does not contain the tip 12b of the load 12. Therefore, even if the detection signal of the sensor 16 output based on the detection range R in FIG. 4A is analyzed, it is not possible to recognize how much the load 12 protrudes from the loading platform 22.

Figure 4B:
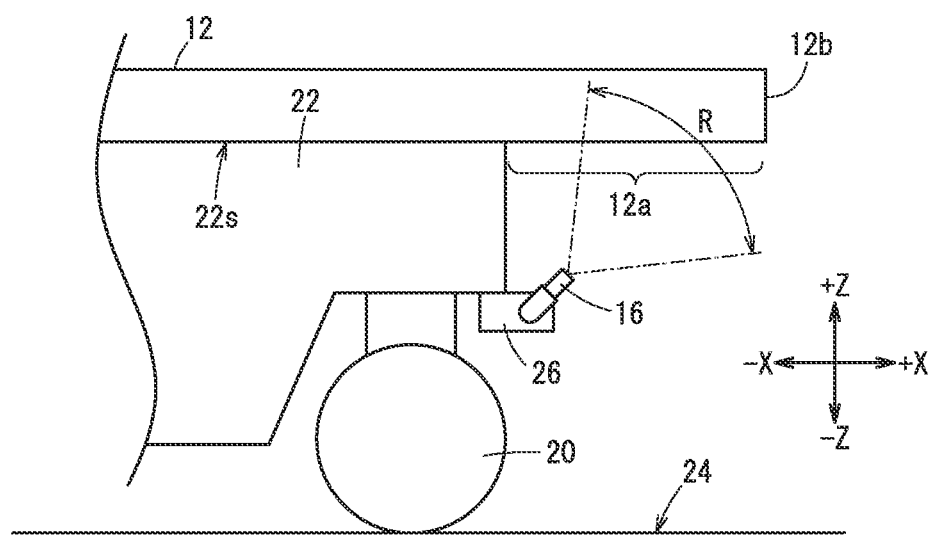
FIG. 4B is a diagram for explaining the sensor that detects an object (load) in a detection range different from that of FIG. 4A.

FIG. 4B is a diagram for explaining the sensor 16 that detects the object (the load 12) in the detection range R different from that in FIG. 4A.

The drive unit 26 may change the detection range R illustrated in FIG. 4A to another detection range R illustrated in FIG. 4B. The detection range R in FIG. 4B contains the tip 12b of the load 12. Therefore, by analyzing the detection signal of the sensor 16 that is output based on the detection range R in FIG. 4B, it is possible to recognize how much the load 12 protrudes from the loading platform 22.

Note that the distance between the sensor 16 and the supporting surface 22s is obvious from the design of the moving body 10. Therefore, based on the detection signal of the sensor 16, it is possible to recognize the relative height position of the object relative to the supporting surface 22s.

The detection signal of the sensor 16 is input to the control device 18.

Figure 5:
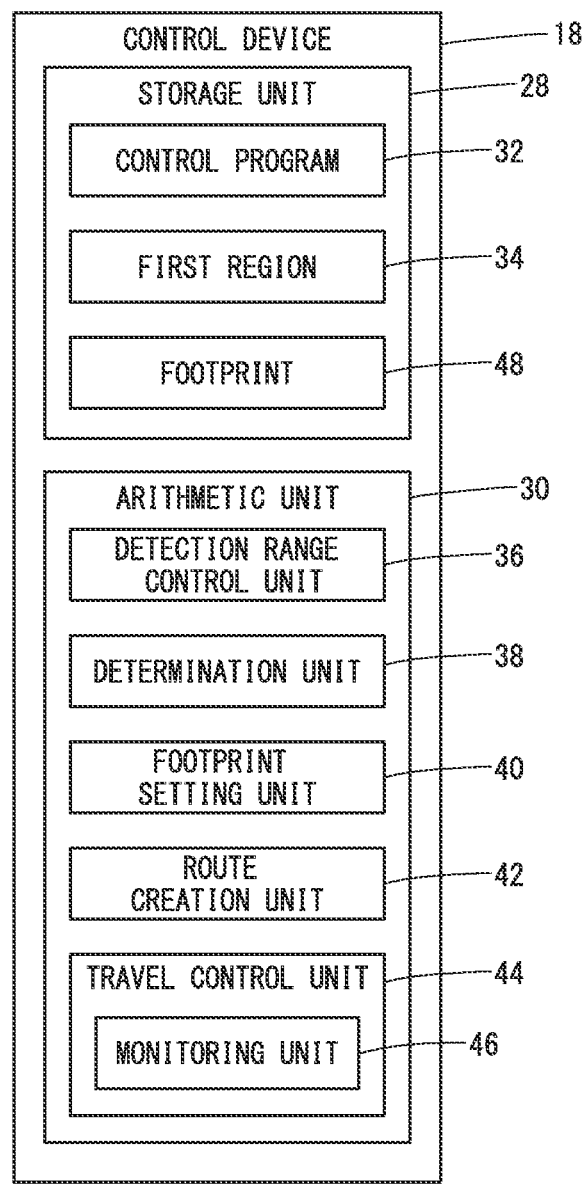
FIG. 5 is a configuration diagram of a control device.

FIG. 5 is a configuration diagram of the control device 18.

The control device 18 is an electronic device (computer) including a storage unit 28 and an arithmetic unit 30.

The storage unit 28 includes one or more memories. The storage unit 28 includes, for example, a random access memory (RAM) and a read only memory (ROM).

The storage unit 28 stores a control program 32, a first region 34, and a footprint 48. The control program 32 is a program for controlling the moving body 10. The first region 34 is a region obtained by projecting the moving body 10 onto the running surface 24. The footprint 48 will be explained below.

The data stored in the storage unit 28 is not limited to the control program 32, the first region 34, and the footprint 48. The storage unit 28 may store various types of data (not illustrated) as necessary.

The arithmetic unit 30 includes a processing circuit. The processing circuit includes, for example, a processor such as a central processing unit (CPU), a graphics processing unit (GPU), or the like. However, the processing circuit of the arithmetic unit 30 may include an integrated circuit such as an application specific integrated circuit (ASIC), a field-programmable gate array (FPGA), or the like. The processing circuit of the arithmetic unit 30 may include a discrete device.

The arithmetic unit 30 includes a detection range control unit 36, a determination unit 38, a footprint setting unit 40, a route creation unit 42, and a travel control unit 44. The travel control unit 44 includes a monitoring unit 46. The detection range control unit 36, the determination unit 38, the footprint setting unit 40, the route creation unit 42, and the travel control unit 44 are realized by the processor of the arithmetic unit 30 executing the control program 32. However, at least part of the detection range control unit 36, the determination unit 38, the footprint setting unit 40, the route creation unit 42, and the travel control unit 44 may be realized by a processing circuit (the above-described ASIC or the like) other than the processor.

The detection range control unit 36 controls the drive unit 26. As a result, the detection range control unit 36 changes the detection range R of the sensor 16 so as to contain, for example, the front end portion 22f (see also FIG. 4A). The positional relationship between the front end portion 22f and the sensor 16 is obvious from the design of the moving body 10. Therefore, the orientation of the sensor 16 that allows the front end portion 22f to be included in the detection range R is obvious.

The determination unit 38 determines whether or not the load (article, part, etc.) 12 protrudes from the loading platform 22, based on the detection signal of the sensor 16. That is, the determination unit 38 determines whether or not the load 12 has a protruding portion 12a, based on the detection signal of the sensor 16.

(1) The protruding portion 12a extends, from the end of the loading platform 22, in the extending direction of the supporting surface 22s of the loading platform 22.

In addition, the load 12 is loaded on the supporting surface 22s. Therefore, (2) the protruding portion 12a is at a position at least higher than the supporting surface 22s.

However, (3) when the lower end of the detected object is located at a position considerably higher than the supporting surface 22s, there is a high possibility that the object is not the load 12.

Based on the above (1) to (3), the determination unit 38 determines that an object is the protruding portion 12a when the object extends in the extending direction of the supporting surface 22s from the end and the object is present within a predetermined height range from the loading platform 22.

The footprint setting unit 40 calculates the footprint 48 (481, 482) of the moving body 10, based on the determination result of the determination unit 38, as follows.

When the load 12 protrudes from the loading platform 22, the footprint setting unit 40 recognizes the shape of the protruding portion 12a based on the detection signal of the sensor 16. In order to more accurately recognize the shape of the protruding portion 12a, the footprint setting unit 40 may cause the detection range control unit 36 to change the detection range R of the sensor 16 (see also FIG. 4A and FIG. 4B). In other words, when the entire shape of the protruding portion 12a cannot be recognized, the footprint setting unit 40 commands the detection range control unit 36 to change the detection range R. Accordingly, the footprint setting unit 40 can collect information necessary for more accurately recognizing the shape of the protruding portion 12a via the sensor 16.

Next, the footprint setting unit 40 recognizes a protruding region based on the shape of the protruding portion 12a. The protruding region is a region 50 obtained by projecting the protruding portion 12a onto the running surface 24 of the moving body 10. Hereinafter, the region 50 is also referred to as a second region 50. Further, the footprint setting unit 40 sets a region formed by the first region 34 stored in the storage unit 28 and the calculated second region 50 as the footprint 481 of the moving body 10. The footprint 481 is a region obtained by adding the first region 34 and the second region 50.

Figure 6A:
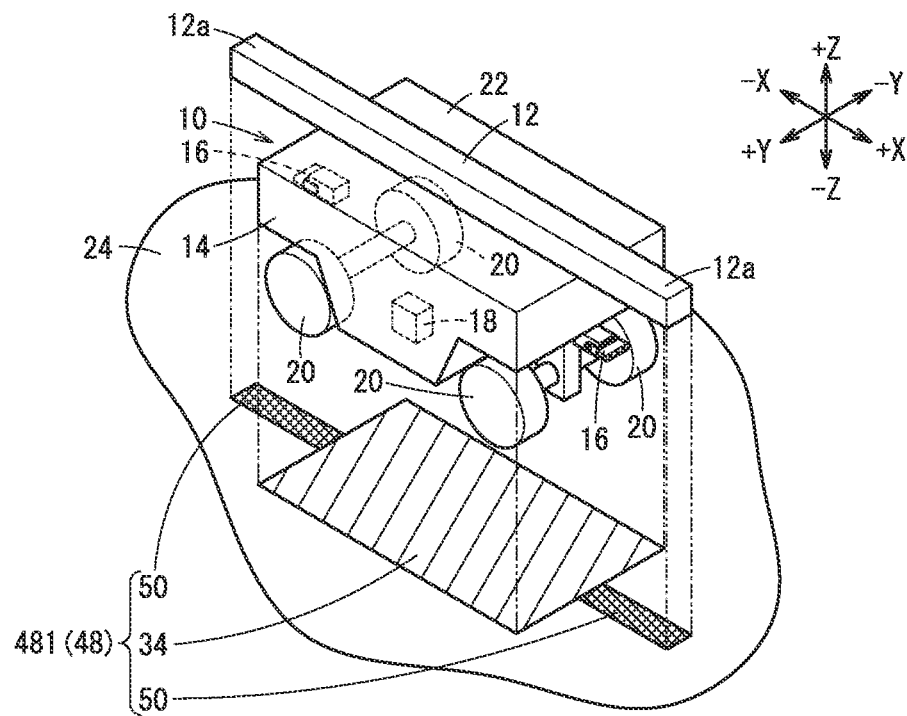
FIG. 6A is a diagram showing a footprint formed by a first region and a second region.

FIG. 6A is a diagram showing a footprint 481 formed by the first region 34 and the second region 50.

If the load 12 does not protrude from the loading platform 22, the footprint setting unit 40 sets the first region 34 as a footprint 482.

Figure 6B:
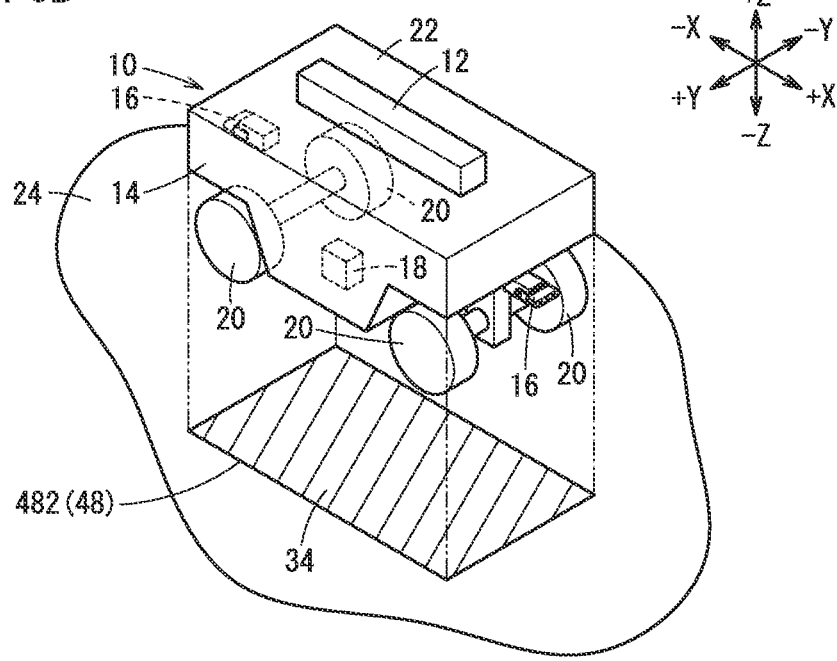
FIG. 6B is a view showing a footprint formed only by the first region.

FIG. 6B is a diagram showing the footprint 482 formed only by the first region 34.

The footprint setting unit 40 stores the set footprint 48 in the storage unit 28.

The route creation unit 42 sets the travel route of the moving body 10 based on the footprint 48 and map information including a starting point and a destination point of the moving body 10. The map information is stored in advance in the storage unit 28.

The route creation unit 42 compares a route in the map information with the footprint 48 of the moving body 10 to thereby determine whether or not the route is passable by the moving body 10.

On the other hand, a footprint determined based on the conventional technique (JP 2017-227955 A) has a circular shape including the projected regions obtained by projecting the moving body 10 and the load 12 on the running surface. In this case, the shape of the footprint is significantly different from the shape of the projected regions of the moving body 10 and the load 12. When the shape of the footprint is significantly different from the shape of the projected regions of the moving body 10 and the load 12, a route through which the moving body 10 actually can pass is likely to be erroneously determined as a route through which the moving body 10 cannot pass.

In contrast, the footprint 481 is formed by the first region 34 obtained by projecting the moving body 10 onto the running surface 24 and the second region 50 obtained by projecting the protruding portion 12a onto the running surface 24. Also, the footprint 482 is formed only from the first region 34. Therefore, based on the footprint 48, the route creation unit 42 can more accurately determine whether or not a route through which the moving body 10 can pass is present in the map information, than in the conventional technique. That is, it is determined that the road through which the moving body 10 can pass is a passable road.

The travel control unit 44 controls autonomous travel of the moving body 10 based on a travel plan. Thus, the moving body 10 can automatically transport the load 12 from the starting point to the destination point.

The monitoring unit 46 monitors the relative positional relationship between the protruding portion 12a recognized by the footprint setting unit 40 and the loading platform 22, based on the detection signal of the sensor 16. Thus, for example, it is detected that the position of the load 12 has been displaced on the loading platform 22.

When the relative movement amount between the protruding portion 12a and the loading platform 22 deviates from a predetermined allowable range while the moving body 10 travels for a predetermined time or a predetermined distance, the monitoring unit 46 interrupts the autonomous traveling of the moving body 10. As a result, it is possible to prevent the load 12 from falling off the loading platform 22.

When the autonomous traveling of the moving body 10 has been interrupted, the monitoring unit 46 may notify the operator of the moving body 10 that the autonomous traveling of the moving body 10 has been interrupted. For example, when the autonomous traveling of the moving body 10 has been interrupted, the monitoring unit 46 may transmit a signal indicating that the autonomous traveling of the moving body 10 has been interrupted, to a terminal owned by the operator.

Note that even when the relative positional relationship between the protruding portion 12a and the loading platform 22 changes, the monitoring unit 46 may cause the moving body 10 to continue traveling if the relative movement amount between the protruding portion 12a and the loading platform 22 is within the allowable range.

Here, it is preferable that the footprint setting unit 40 sets the footprint 48 again based on the protruding portion 12a of the load 12 that has been displaced on the loading platform 22. As a result, the route creation unit 42 can create a travel plan again based on the latest footprint 48. In addition, the travel control unit 44 can prevent a collision between the load 12 and an obstacle by causing the moving body 10 to travel in accordance with the travel plan based on the latest footprint 48.

Modification

Modifications of the above-described embodiment will be described below. However, description overlapping with the description of the above embodiment will be omitted as much as possible in the following description. Components that have already been described in the above embodiment are denoted by the same reference numerals as in the above embodiment unless otherwise indicated.

Modification 1

The number of the sensors 16 included in the moving body 10 may be one, or three or more. Further, the sensors 16 may be provided at both end portions of the loading platform 22 in the Y direction. Further, the sensor 16 may be provided above the supporting surface 22s.

Modification 2

The sensor 16 may be used for purposes other than detection of the protruding portion 12a while the moving body 10 is traveling. For example, the detection range R of the sensor 16 can be changed by the drive unit 26. While the moving body 10 is traveling, the sensor 16 may be used to detect, for example, an obstacle present in the traveling direction of the moving body 10. Since one sensor 16 can be used for a plurality of purposes, an increase in the number of components included in the moving body 10 is suppressed.

Modification 3

Figure 7:
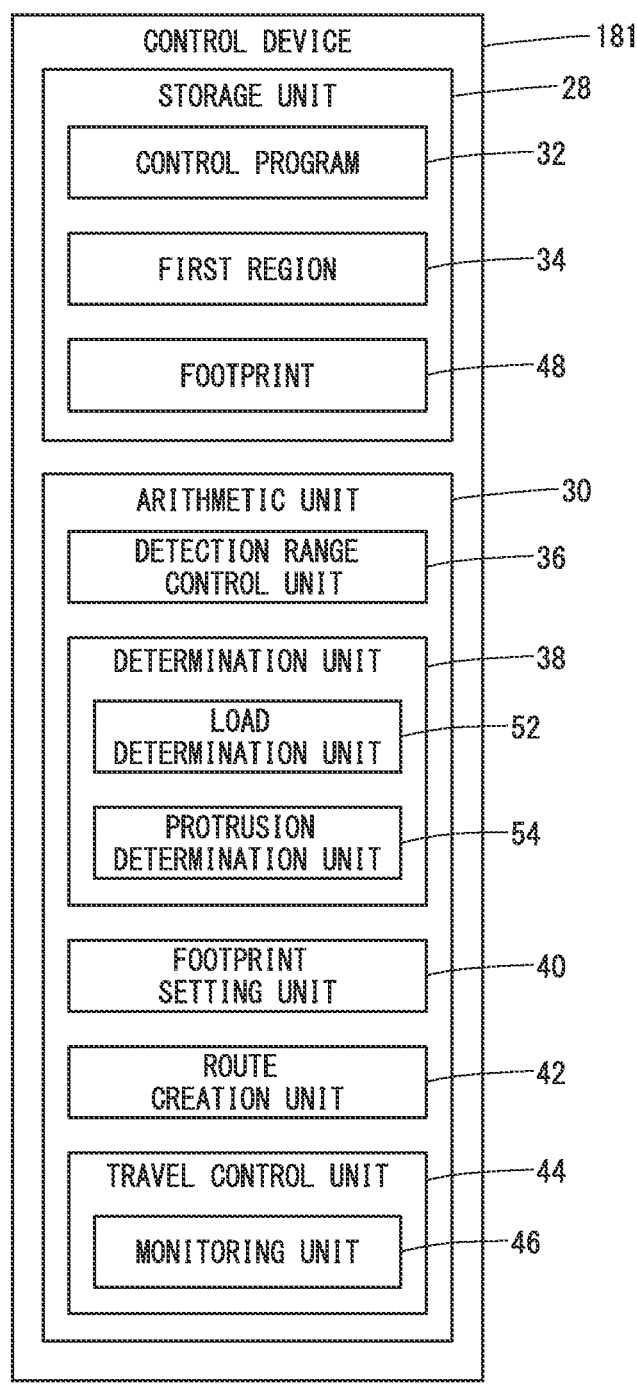
FIG. 7 is a configuration diagram of a control device according to a third modification.

FIG. 7 is a configuration diagram of a control device 181 according to a third modification.

A case where the sensor 16 is a camera that captures image data will be described. The moving body 10 may include the control device 181. The control device 181 is an electronic device for controlling the moving body 10. The control device 181 contains the components of the control device 18 (see also FIG. 5). However, the determination unit 38 includes a load determination unit 52 and a protrusion determination unit 54.

The load determination unit 52 analyzes the image data captured by the camera 16 to thereby determine whether or not the object shown in the image data is a load (loaded object) 12. Examples of a method of determining whether or not the object shown in the image data is a load 12 include a first determination method and a second determination method, as described below.

The first determination method is a method of determining whether or not the object is the load 12 based on whether or not the object shown in the image data has a predetermined marker or a predetermined pattern attached thereto.

The predetermined marker or the predetermined pattern is stored in advance in the storage unit 28. The load determination unit 52 determines whether or not the object shown in the image data is the load 12 by comparing the predetermined marker or the predetermined pattern stored in the storage unit 28 with the object.

The second determination method is a method of determining whether or not the object shown in the first image data and the second image data is the load 12 based on a comparison between the first image data and the second image captured after capturing of the first image. The first image data is image data captured by the camera 16 at a first time point. The second image data is image data captured by the camera 16 at a second time point. The second time point is a time point later than the first time point.

When the detection range (image-capturing range) R of the camera 16 contains the loading platform 22, the load (article, part, etc.) 12, and their background other than the loading platform and the load, the background may be different between the first image data and the second image data captured after capturing of the first image data. On the other hand, the loading platform 22 and the load 12 are similarly shown in both the first image data and the second image data regardless of differences in the background. Therefore, the load determination unit 52 can distinguish between the loading platform 22 and the background based on the difference between the first image data and the second image data. Similarly, the load determination unit 52 can distinguish between the load 12 and the background based on the difference between the first image data and the second image data.

In order to more markedly accentuate the difference between the background of the first image data and the background of the second image data, it is more preferable that the position at which the first image data is captured is different from the position at which the second image data is captured. The load determination unit 52 may instruct the travel control unit 44 to move the moving body 10 in order to make the position at which the first image data is captured and the position at which the second image data is captured different from each other.

The protrusion determination unit 54 determines whether or not the load 12 protrudes from the loading platform 22 based on the image data and the determination result of the load determination unit 52. When the first image data and the second image data are given, the protrusion determination unit 54 may determine whether or not the load 12 protrudes from the loading platform 22 based on the first image data or the second image data and the determination result of the load determination unit 52.

According to the present modification, the footprint setting unit 40 can recognize the second region 50 (the protruding portion 12a) based on the determination result of the protruding determination unit 54.

Modification 4

The drive unit 26 may movably support the sensor 16. For example, the drive unit 26 may include a rail that is provided on the front end portion 22f and extends in the Y direction, a slider that slides along the rail, and an actuator that slides the slider. The sensor 16 is attached to the slider. Thus, the detection range R of the sensor 16 is changed in accordance with the movement of the slider. Note that the rail may extend in the X direction or the Z direction.

Modification 5

The footprint setting unit 40 may set the footprint 48 in consideration of an allowable range (see the embodiment) of the relative movement amount between the protruding portion 12a and the loading platform 22.

For example, the footprint setting unit 40 sets, as the footprint 481, a region that is a predetermined percentage larger than the sum of the first region 34 and the second region 50.

Here, the predetermined percentage is determined based on the above allowable range, i.e., being determined such that the projected region of the protruding portion 12a falls within the footprint 481 even when the relative movement of the protruding portion 12a relative to the loading platform 22 occurs with the amount of the relative movement falling within that allowable range.

The footprint 481 described in the embodiment completely coincides with a region obtained by adding the first region 34 and the second region 50. In this case, even if the amount of the relative movement of the protruding portion 12a relative to the loading platform 22 is within the allowable range, the projected region of the protruding portion 12a after the relative movement protrudes from the footprint 481. In this case, there is a possibility that the protruding portion 12a collides with an obstacle during traveling of the moving body 10.

In this regard, according to the present modification, the footprint 481 larger than the region obtained by adding the first region 34 and the second region 50 is set based on a predetermined percentage. Accordingly, if the amount of the relative movement of the protruding portion 12a relative to the loading platform 22 is within the allowable range, the projected region of the protruding portion 12a after the relative movement still remains within the footprint 481. As a result, the protruding portion 12a is more reliably prevented from colliding with an obstacle while the moving body 10 is traveling.

Modification 6

The footprint setting unit 40 may set the footprint 481 based on the protruding portion 12a even after the footprint 482 has been set.

For example, even though the load 12 is loaded on the loading platform 22 without protruding from the loading platform 22, there is a possibility that protruding of the load from the loading platform 22 may occur due to relative movement of the load relative to the loading platform 22 during traveling of the moving body 10. In this case, the footprint setting unit 40 newly sets the footprint 481 based on the protruding portion 12a even if the footprint 482 has already been set.

Note that the present invention is not limited to the above-described embodiments and modifications, and various configurations can be adopted without departing from the gist of the present invention.

Invention Obtained from Embodiment

The invention that can be grasped from the above-described embodiment and modifications will be described below.

The moving body (10) is equipped with the loading platform (22) and is configured to carry a load (12) loaded on the loading platform. The moving body includes: the sensor (16) configured to detect the protruding portion (12a) of the load, the protruding portion protruding from the loading platform; the determination unit (38) configured to determine whether or not the protruding portion is present based on a signal of the sensor; the footprint setting unit (40) configured to set, as a footprint (48), a region formed by the first region (34) obtained by projecting the moving body onto a ground and the second region (50) obtained by projecting the protruding portion onto the ground when the load protrudes from the loading platform, and set the first region as the footprint when the load does not protrude from the loading platform; and the travel control unit (44) configured to control traveling of the moving body based on the footprint.

Accordingly, it is possible to more accurately determine whether or not a route is a passable route for the moving body, based on the footprint. As a result, it is possible to prevent the moving body from traveling toward the destination point while making an unnecessary detour.

The sensor may include the distance measuring sensor that is disposed at an end portion (22f, 22r) of the loading platform and below the supporting surface (22s) of the loading platform, the distance measuring sensor being configured to detect an end of the loading platform and an object around the end, and detect the distance between the supporting surface and the object. The determination unit may determine that the object is the protruding portion when the object extends in the extending direction of the supporting surface from the end and the object is present within a predetermined height range from the loading platform. The footprint setting unit may recognize the second region based on a determination result of the determination unit. Thus, the protruding portion can be detected while a collision between the sensor and the load is prevented.

The sensor may capture image data of surroundings of the loading platform, the determination unit may determine whether or not the protruding portion is present based on the image data, and the footprint setting unit may recognize the second region based on a determination result of the determination unit. Thus, the protruding portion can be detected without using a distance measuring sensor.

The determination unit may include: the load determination unit (52) configured to determine whether or not an object shown in the image data is the load, based on whether or not the object has the predetermined marker or the predetermined pattern attached thereto; and the protrusion determination unit (54) configured to determine whether or not the load protrudes from the loading platform based on the image data. Accordingly, the protruding portion can be more accurately detected based on the predetermined marker or the predetermined pattern.

The sensor may capture first image data of the surroundings of the loading platform at the first time point and capture second image data of the surroundings of the loading platform at the second time point that is later than the first time point. The determination unit may include: the load determination unit (52) configured to determine whether or not an object shown in the first image data and the second image data is the load based on a comparison between the first image data and the second image data; and the protrusion determination unit (54) configured to determine whether or not the load protrudes from the loading platform based on the first image data or the second image data. Accordingly, the protruding portion can be more accurately detected based on the comparison between the first image data and the second image data.

The moving body may further include the drive unit (26) that changes the detection range (R) of the sensor by moving or rotating the sensor. Accordingly, the object (the load) protruding from the end of the loading platform, and the tip of the protruding portion can be easily detected by one sensor.

The drive unit may change the detection range such that the detection range contains an end portion of the loading platform. As a result, the determination unit can accurately distinguish between a load (a loaded object) that protrudes from the end of the loading platform and a load (a loaded object) that does not protrude from the end of the loading platform.

The travel control unit may include the monitoring unit (46) configured to monitor the relative positional relationship between the protruding portion and the loading platform based on the signal of the sensor, and the monitoring unit may interrupt traveling of the moving body when the amount of relative movement between the protruding portion and the loading platform deviates from the allowable range. With this configuration, the load can be prevented from falling down from the loading platform.

When the relative positional relationship between the protruding portion and the loading platform changes after the footprint has been set, the footprint setting unit may set the footprint again based on the relative positional relationship that has changed. With this configuration, the travel control unit can execute the travel control of the moving body based on the latest footprint.

What is claimed is:

1. A moving body equipped with a loading platform and configured to carry a load loaded on the loading platform, the moving body comprising:
one or more processors; and
a sensor configured to detect a protruding portion of the load, the protruding portion protruding from the loading platform,
wherein the sensor captures first image data of surroundings of the loading platform at a first time point and captures second image data of surroundings of the loading platform at a second time point that is later than the first time point, and
the one or more processors execute programs stored in memory to cause the moving body to:
move the moving body during a time range from when the first image data is captured to when the second image data is captured;
determine whether or not an object shown in the first image data and the second image data is the load based on a comparison between the first image data and the second image data;
determine whether or not the load protrudes from the loading platform based on the first image data or the second image data;
set, as a footprint, a region formed by a first region obtained by projecting the moving body onto a ground and a second region obtained by projecting the protruding portion onto the ground when the load protrudes from the loading platform, and set the first region as the footprint when the load does not protrude from the loading platform;
control autonomous traveling of the moving body based on the footprint;
monitor a relative positional relationship between the protruding portion and the loading platform, based on the signal of the sensor; and
interrupt controlling the autonomous traveling of the moving body when a relative movement amount between the protruding portion and the loading platform deviates from an allowable range.

2. The moving body according to claim 1, wherein the sensor includes a distance measuring sensor that is disposed at an end portion of the loading platform and below a supporting surface of the loading platform, the distance measuring sensor being configured to detect the end portion of the loading platform and an object around the end portion of the loading platform, and detect a distance between the supporting surface and the object, and
wherein the one or more processors cause the moving body to:
determine that the object is the protruding portion when the object extends, from the end portion of the loading platform, in an extending direction of the supporting surface and the object is present within a predetermined height range from the loading platform; and
recognize the second region based on a determination result of a determination of whether or not the protruding portion is present.

3. The moving body according to claim 1, further comprising:
an actuator configured to change a detection range of the sensor by moving or rotating the sensor.

4. The moving body according to claim 3, wherein the actuator changes the detection range in a manner so that the detection range contains an end portion of the loading platform.

5. The moving body according to claim 1, wherein the one or more processors cause the moving body to: set, when the relative positional relationship between the protruding portion and the loading platform changes after the footprint has been set, the footprint again based on the relative positional relationship that has changed.

* * * * *